Jan. 29, 1963 E. C. COTTELL ETAL Re. 25,324

APPARATUS FOR THE MECHANICAL PRODUCTION OF ACOUSTIC VIBRATIONS FOR USE IN EMULSIFICATION, DISPERSION OR LIKE PROCESS

Original Filed July 15, 1952

Inventors
Eric C. Cottell
John E. Goodman
By
Leon Simon
Attorney

United States Patent Office

Re. 25,324
Reissued Jan. 29, 1963

25,324

APPARATUS FOR THE MECHANICAL PRODUCTION OF ACOUSTIC VIBRATIONS FOR USE IN EMULSIFICATION, DISPERSION OR LIKE PROCESS

Eric C. Cottell, Ilkley, and John E. Goodman, Stanks, Leeds, England, assignors, by mesne assignments, to Sonic Engineering Corporation, a corporation of Connecticut Original No. 2,657,021, dated Oct. 27, 1953, Ser. No. 298,978, July 15, 1952. Application for reissue Feb. 19, 1962, Ser. No. 176,174. In Great Britain Feb. 22, 1951

5 Claims. (Cl. 259—1)

Matter enclosed in heavy brackets [ ] appears in the original patent but forms no part of this reissue specification; matter printed in italics indicates the additions made by reissue.

This invention relates to apparatus for the mechanical production of acoustic vibrations generally in the ultrasonic range in a manner suitable particularly for use in the emulsification or homogenisation of oil and water and suspensions of solid matter in liquids and like purposes.

The apparatus makes use of the known principle of mechanical production of ultrasonic or like acoustic vibrations which is used in a liquid whistle and which consists essentially in causing a jet of liquid to impinge on a vibratory member so as to produce high frequency vibrations, but applies this principle in a practical arrangement capable of being put to numerous industrial uses and particularly in a readily portable form.

According to the invention the apparatus consists in a jet-form structure to which liquid can be supplied under pressure and having one or more restricted outlets or nozzles which direct the liquid stream against a blade or like vibrator so as to produce acoustic vibrations generally in the ultrasonic range, the jet-form structure and vibrator being mounted so as to be readily introduced into or close to the medium to be treated.

Preferably a blade or other form of vibrator is mounted on the jet-form structure which in turn is mounted on the end of the fluid supply pipe or in a frame or on arms and such pipe, frame or arms can be adapted for fixing upon a vessel which is to contain the medium to be treated or can be swung into and out of working position as desired.

In order that the invention may be clearly understood and readily carried into effect the same will now be more fully described with reference to and by the aid of the accompanying drawings, wherein.

In the illustrated embodiment of the invention a rotary pump 1 and electric motor 2 are mounted as a unit in a casing from which depend suction and delivery pipes 3, 4. The lower end of the delivery pipe 4 has connected to it the jet-form structure which may be moulded in a suitable synthetic material or cast in suitable metal.

Figure 3:
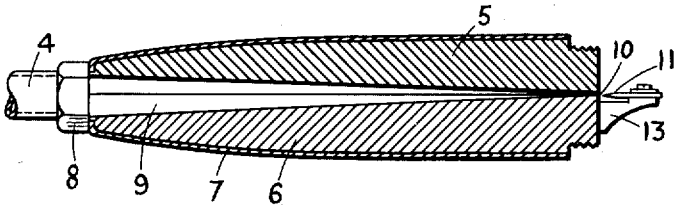
FIGURE 3 is an elevation mainly in section of the body of the jet-form structure.
Figure 4:
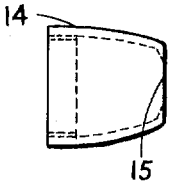
FIGURE 4 is an elevation of a bell-like nose piece forming the outer end of the jet-form structure.
Figure 5:
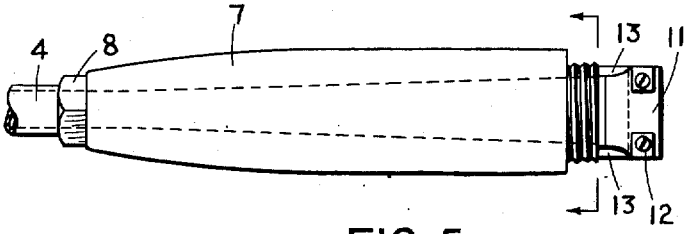
FIGURE 5 is a plan of the body shown in FIGURE 3.
Figure 6:
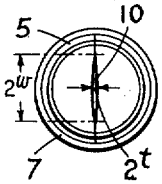
FIGURE 6 is a transverse section taken on the line A—A in FIGURE 5 showing the detail of the jet-form outlet.
Figure 1:
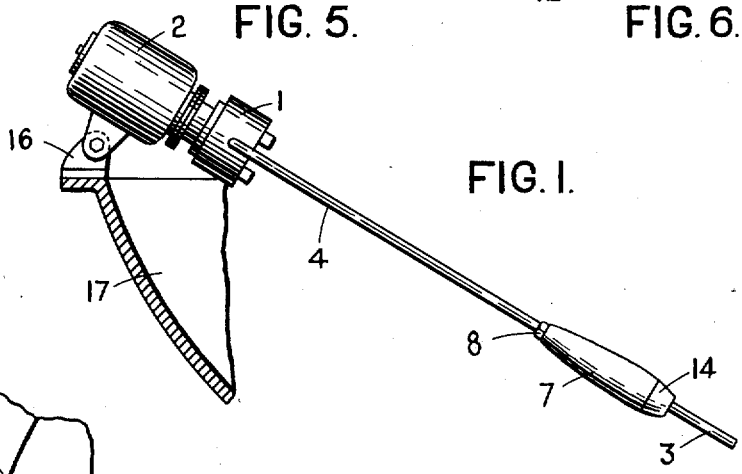
FIGURES 1 and 2 are respectively an elevation and plan of one form of portable apparatus according to the invention shown mounted on the side of a mixing pan.
Figure 2:
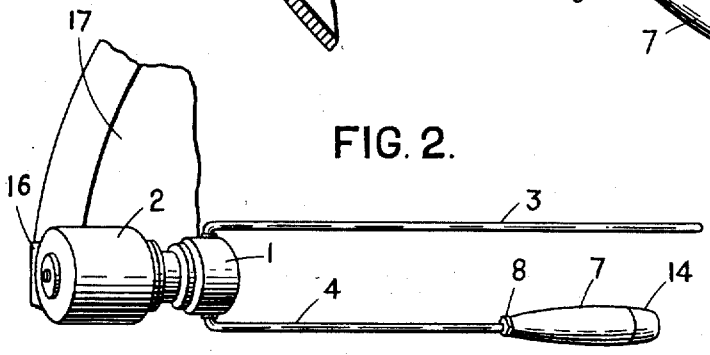

This jet-form structure is shown as consisting of a body in halves 5, 6 with an outer covering 7, or alternatively the two halves can be bolted together, the body being connected at the inner end by a union 8 to the delivery pipe 4 and having an internal passage 9 which is circular at its inner end and gradually flattens out in smooth contours towards the outer end where it forms a slit like outlet 10. This outlet 10 may vary somewhat in shape, but as illustrated its section is represented by the intersection of two circles of the same radius which radius is such that a straight line joining the two points of intersection is in the ratio of 50:1 relative to the height of the rightangular upright drawn from the centre of such line to the circumference of one circle. With the dimensions w and t indicated in FIGURE 6, the diameter of each circle would be represented by $$\frac{w^2}{t}+t$$

In any event the shape of outlet will be designed with the object of producing a jet of liquid best adapted to cooperate with the vibratory blade.

The blade 11 is preferably made of spring steel of the shape illustrated with a hollow ground edge on which the liquid jet impinges. This blade is clamped by narrow strips and screws 12 to two arms 13 formed with or secured to the body half 6, so that the blade is free to vibrate at its own frequency without support along its sharpened edge.

A resonant bell or nose piece 14 can be screwed onto the threaded ends of the body halves to surround the blade and its mounting, and this bell has its internal bore reduced to form an open circular end 15 of a diameter approximately equivalent to the length of the jet-form outlet 10. By this means the effect of the vibration may be amplified and a cavity maintained in the bell by the ejector effect of the liquid passing at high speed across the blade and through the bell. This may maintain the velocity of the jet across the blade at a faster rate than if it were immersed in the liquid without the bell attached, owing to the inertia of the liquid itself slowing down the jet when it is not passing through the bell.

The casing of the motor 2 is shown with a swivel bracket 16 by which the whole apparatus can be pivotally mounted on the side of a pan or like vessel 17 to contain the liquid to be treated and this bracket can include readily detachable clamping means to enable the apparatus to be moved at will. The apparatus can be counterbalanced by suitable means (not shown) so as to be readily lowered into the vessel. Alternatively the apparatus would be arranged for suspending above the vessel and lowering into it.

It is intended generally to operate the apparatus with the outlet and blade below the liquid level in the vessel, though it may operate just above the surface with the suction pipe 3 dipping below.

When operating with the apparatus the mixture is drawn into the pump and then expelled through the jet-form outlet at a pressure (say) of from 130 to 300 lbs., per square inch, impinging on the blade and deflecting it. The elasticity of the blade itself restores it to its normal position and it is again deflected in the opposite direction. This cycle continues at very high speed and ultrasonic oscillation results. Cavitation at the blade tip causes violent agitation of the liquid and consequent emulsification or such like due to very high pressures realised on the collapse of the cavities.

The pump can be provided with a by-pass to vary its capacity and, therefore, the pressure and intensity of the oscillations produced.

As an alternative a thick blade of concave wedge or other shape may be mounted on a torsion bar which would allow the blade to vibrate although too thick to oscillate due to its own elasticity. In such case there would be less likelihood of the blade breaking through fatigue.

It is believed that an apparatus according to the invention will be of more simple and compact construction than any at present employed in industry and may have an extensive application in the pharmaceutical, cosmetic, textile, food, mineral preparation, brewing, oil, engineering and other industries.

Practical tests indicate that the apparatus will absorb only a small fraction of the power needed by equivalent emulsifiers of conventional types and its efficiency will enable less emulsifying agent to be used and produce a very finely divided suspension.

We claim:

1. Apparatus for producing emulsification or homogenisation of oil and water and suspensions of solid matter in liquids and like purposes by mechanically produced acoustic vibrations in or near the ultrasonic range, comprising in combination a jet-form structure having at least one restricted outlet or nozzle, a blade-like vibrator element having at least a portion thereof supported for vibratory movement and located with its thin edge in line with said outlet, *a resonant bell or nose piece fixed at one end to the jet-form structure and surrounding said blade-like vibrator element and having an opening in its other end,* means for passing the liquid to be treated under pressure through said jet-form structure and against the thin edge of said vibrator element so as to produce the acoustic vibrations, and means for introducing said jet-form structure and vibrator element into or close to the medium to be treated.

2. Apparatus for producing emulsification or homogenisation of oil and water and suspensions of solid matter in liquids and like purposes by mechanically produced acoustic vibrations in or near the ultrasonic range, comprising in combination a jet-form structure having at least one restricted outlet or nozzle, a blade-like vibrator element having at least a portion thereof capable of vibratory movement and mounted on said structure with its thin edge in line with said outlet, *a resonant bell or nose piece fixed at one end to the jet-form structure and surrounding said blade-like vibrator element and having an opening in its other end,* means for passing the liquid to be treated under pressure through a delivery pipe on which said structure is mounted and through said structure and against the thin edge of said vibrator element so as to produce the acoustic vibrations, and means for supporting said delivery pipe, jet-form structure and vibrator element in connection with a vessel which is to contain the medium to be treated so as to be capable of readily being moved into and out of working position.

3. Apparatus as called for in claim 2, including a jet-form structure having an internal passage which changes by smooth contours from a substantially circular inlet at the inner end to a slit-like outlet at the outer end, and a vibratory blade located substantially in the plane of said slit-like outlet so as to receive the jet of liquid against its free edge.

4. Apparatus as called for in claim 2, including a jet-form structure having an internal passage which changes by smooth contours from a substantially circular inlet at the inner end to a slit-like outlet at the outer end, and a vibratory blade located substantially in the plane of said slit-like outlet so as to receive the jet of liquid against its free edge *and wherein said resonant bell or nose piece is fixed at one end to the outer end of said jet-form structure and has a circular opening in its other end of a diameter approximately equivalent to the length of said outlet.* [and a resonant bell or nose piece applied to the outer end of said jet-form structure and surrounding said blade and its mounting and having a circular opening in its outer end of a diameter approximately equivalent to the length of the jet-form outlet.]

5. Apparatus for producing emulsification or homogenisation of oil and water and suspensions of solid matter in liquids and like purposes by mechanically produced acoustic vibrations in or near the ultrasonic range comprising in combination an electric motor and a pump driven thereby mounted as a unit, a suction pipe and a delivery pipe connected to and supported from said pump, a jet-form structure mounted on the outer end of said delivery pipe and having an internal passage which changes by smooth contours from a substantially circular inlet at the inner end to a slit-like outlet at the outer end, a thin vibratory blade clamped by its thicker edge to two arms projecting forwards from said jet-form structure and located with its sharpened edge opposite and parallel to said slit-like outlet so as to be vibrated by the liquid jet impinging on it, a resonant bell or nose piece applied to the outer end of said jet-form structure and surrounding said blade and its mounting and having a circular opening in its outer end of a diameter approximately equivalent to the length of said slit-like outlet, and disengageable means for supporting the complete apparatus in connection with a vessel to contain the liquid to be treated with the suction pipe dipping into said liquid and for enabling said apparatus to be lowered into and raised out of working position.

References Cited in the file of this patent or the original patent

UNITED STATES PATENTS

| | | |
|---|---|---|
| 1,445,427 | Werner | Feb. 13, 1923 |
| 1,678,225 | Kincade | July 24, 1928 |
| 2,005,800 | O'Boyle | June 25, 1935 |

FOREIGN PATENTS

| | | |
|---|---|---|
| 873,523 | France | Mar. 23, 1942 |
| 611,830 | Great Britain | Nov. 4, 1948 |

OTHER REFERENCES

Alexander: "Emulsification With Acoustic Waves" (from "Paint Manufacture," May 1951, vol. XXI, No. 5, pages 157–161 and 175).